United States Patent
Uchino et al.

(10) Patent No.: US 12,057,917 B2
(45) Date of Patent: *Aug. 6, 2024

(54) TERMINAL WITH BEAM FAILURE DETECTION AND RECOVERY PROCEDURE

(71) Applicant: NTT DOCOMO, INC., Tokyo (JP)

(72) Inventors: Tooru Uchino, Tokyo (JP); Yuki Matsumura, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 330 days.

This patent is subject to a terminal disclaimer.

(21) Appl. No.: 17/620,909

(22) PCT Filed: Jun. 21, 2019

(86) PCT No.: PCT/JP2019/024846
§ 371 (c)(1),
(2) Date: Dec. 20, 2021

(87) PCT Pub. No.: WO2020/255424
PCT Pub. Date: Dec. 24, 2020

(65) Prior Publication Data
US 2022/0352959 A1    Nov. 3, 2022

(51) Int. Cl.
*H04B 7/06* (2006.01)
*H04L 5/00* (2006.01)
*H04W 76/15* (2018.01)
*H04W 76/19* (2018.01)
*H04W 80/02* (2009.01)

(52) U.S. Cl.
CPC ......... *H04B 7/0695* (2013.01); *H04L 5/0051* (2013.01); *H04W 76/19* (2018.02); *H04W 80/02* (2013.01)

(58) Field of Classification Search
CPC ..... H04B 7/0695; H04B 7/088; H04L 5/0051; H04L 5/001; H04L 5/0023; H04L 5/0048; H04W 76/19; H04W 80/02; H04W 76/15
See application file for complete search history.

(56) References Cited

U.S. PATENT DOCUMENTS

| | | | |
|---|---|---|---|
| 2019/0052339 A1* | 2/2019 | Zhou | H04W 76/19 |
| 2020/0145083 A1* | 5/2020 | John Wilson | H04B 7/0695 |
| 2020/0252329 A1* | 8/2020 | Tang | H04L 45/24 |
| 2021/0153230 A1* | 5/2021 | Tang | H04W 72/20 |
| 2021/0314051 A1* | 10/2021 | Yang | H04L 5/001 |

(Continued)

OTHER PUBLICATIONS

Office Action in the counterpart Chinese Application No. 201980097633.X, mailed May 6, 2023 (20 pages).

(Continued)

*Primary Examiner* — Harry H Kim
(74) *Attorney, Agent, or Firm* — Osha Bergman Watanabe & Burton LLP

(57) ABSTRACT

A terminal (200) configures PCell and SCell simultaneously. The terminal (200) includes a receiving unit (220) that receives a reference signal for use in a detection of a beam failure in the SCell, and a controller (270) that performs a beam failure recovery procedure based on a reception quality of the reference signal. The SCell belongs to a predetermined group regarding the BFR procedure. The controller (270) performs the BFR procedure in a predetermined cell within the predetermined group.

5 Claims, 9 Drawing Sheets

(56) References Cited

U.S. PATENT DOCUMENTS

2022/0321193 A1* 10/2022 Uchino ................. H04W 76/19
2022/0321194 A1* 10/2022 Uchino ............... H04W 52/365
2022/0321195 A1* 10/2022 Uchino ................. H04W 76/16

OTHER PUBLICATIONS

ZTE: "Enhancements on multi-beam operation", 3GPP TSG RAN WG1 Meeting #97, R1-1906237, Reno, USA, May 13-17, 2019 (18 pages).
Vivo: "Discussion on the SCell BFR", 3GPP TSG-RAN WG2 Meeting #101bis, R2-1804696, Sanya, China, Apr. 16-20, 2018 (7 pages).
International Search Report issued in PCT/JP2019/024846 on Aug. 20, 2019 (2 pages).
Written Opinion of the International Searching Authority issued in PCT/JP2019/024846 on Aug. 20, 2019 (3 pages).
RAN1; "LS on MAC CE design for SCell BFR"; 3GPP TSG-RAN WG1 Meeting #97, R1-1907870; Reno, USA; May 13-17, 2019 (1 page).
Office Action issued in the counterpart Chinese Application No. 201980097633.X, mailed Oct. 18, 2023 (15 pages).
Asia Pacific Telecom: "Enhancements on Multi-beam Operations", 3GPP TSG-RAN WG1 Meeting #97, R1-1907360; Reno, USA, May 13-17, 2019 (7 pages).

* cited by examiner

US 12,057,917 B2

TERMINAL WITH BEAM FAILURE DETECTION AND RECOVERY PROCEDURE

TECHNICAL FIELD

The present invention relates to a terminal that performs a beam failure recovery.

BACKGROUND ART

The 3rd Generation Partnership Project (3GPP) specifies Long Term Evolution (LTE) and specifies LTE-Advanced (hereinafter, collectively referred to as LTE) for the purpose of further speeding up the LTE. In addition, in the 3GPP, specifications of a succession system of the LTE, referred to as 5G, New Radio (NR) or the like, have been studied.

In the NR, a large number of terminals can communicate simultaneously by directing different beams to respective terminals using beam forming.

Accordingly, Release 15 specifies a beam failure recovery (BFR) procedure to be performed by a terminal when the terminal detects a beam failure in a primary cell (PCell).

In addition, in the 3GPP, it is discussed that the BFR procedure is also performed even in a secondary cell (SCell) (see Non Patent Document 1).

In the BFR procedure, when a terminal detects a beam failure, the terminal transmits a beam failure recovery request to a network, specifically, a radio base station.

PRIOR ART DOCUMENT

Non-Patent Document

Non Patent Document 1: "LS on MAC CE design for SCell BFR", R1-1907870, 3GPP TSG RAN WG1 Meeting #97, 3GPP, May, 2019.

SUMMARY OF THE INVENTION

Generally, the number of SCells is larger than the number of SpCells. For this reason, in each Scell, when each terminal performs the BFR procedure, the beam failure recovery request is transmitted, which may increase a load on the network.

Therefore, the present invention has been made in view of such a situation, and an object of the present invention is to provide a terminal, which simultaneously configures a primary cell and a secondary cell, capable of recovering a beam failure in the secondary cell while suppressing an increase in a load on a network.

According to an aspect of the present invention, there is provided a terminal (200) that simultaneously configures a primary cell (PCell) and a secondary cell (SCell), including a receiving unit (220) that receives a reference signal for use in a detection of a beam failure in the secondary cell (SCell), and a controller (270) that performs a beam failure recovery procedure based on a reception quality of the reference signal, in which the secondary cell (SCell) belongs to a predetermined group regarding the beam failure recovery procedure, and the controller (270) performs the beam failure recovery procedure in a predetermined cell within the predetermined group.

MODES FOR CARRYING OUT THE INVENTION

Figure 1:
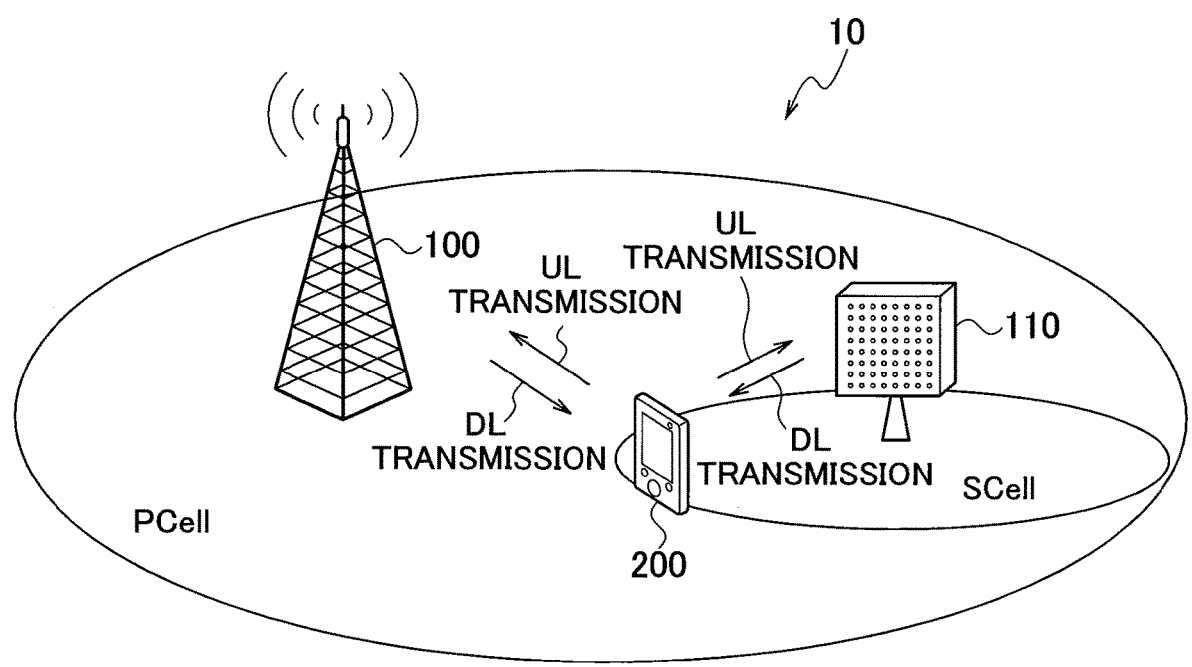
FIG. 1 is an overall schematic configuration diagram of a radio communication system 10.

Hereinafter, embodiments of the present invention will be described with reference to the accompanying drawings. Note that the same functions and configurations are denoted by the same or similar reference numerals, and description thereof is omitted as appropriate.

(1) Overall Schematic Configuration of Radio Communication System

FIG. 1 is an overall schematic configuration diagram of a radio communication system 10 according to the embodiment. The radio communication system 10 is a radio communication system according to 5G (NR).

As illustrated in FIG. 1, the radio communication system 10 includes radio base stations 100, 110 and a terminal 200. The terminal 200 is also referred to as a user equipment (UE) or media access control (MAC) entity. Note that a specific configuration of the radio communication system 10 including the number of radio base stations and terminals is not limited to the example illustrated in FIG. 1.

Each of the radio base stations 100, 110 is a gNB or an eg-eNB, and is included in a Next Generation-Radio Access Network (NG-RAN, not illustrated). The NG-RAN is connected to a core network (5GC, not illustrated) according to the NR. Note that the NG-RAN and the 5GC may be simply expressed as a "network".

The radio base stations 100, 110 perform radio communication according to the NR between the radio base stations 100, 110 and the terminal 200.

The radio base stations 100, 110 and the terminal 200 can support Massive MIMO in which a more highly directional beam is generated, carrier aggregation (CA) in which a plurality of component carriers (CCs) are used, dual connectivity (DC) for simultaneously transmitting CCs between a plurality of NG-RAN Nodes and a terminal, and the like, by controlling a radio signal transmitted from a plurality of antenna elements. Note that the CC is also referred to as a carrier.

In the NR, a serving cell is classified as follows. Note that the serving cell is a cell in which a radio link is established between the terminal and the cell.

A group of serving cells associated with a radio base station (master node (MN)) that provides a control plane connected to the core network, is referred to as a master cell group (MCG). The MCG includes a primary cell (hereinafter, referred to as PCell) and one or more secondary cells (hereinafter, referred to as SCell). The PCell is a cell used so that a terminal starts an initial connection with the MN.

A group of serving cells associated with a radio base station (secondary node (SN)) that provides additional resources to a terminal without providing a control plane connected to the core network, is referred to as a secondary cell group (SCG). The SCG includes a primary SCell (hereinafter, referred to as PSCell) and one or more SCells. The PSCell is a cell used so that a terminal starts an initial connection with the SN.

Note that the PCell is also referred to as a special cell (SpCell) in the MCG. In addition, PSCell is also referred to as the SpCell in the SCG. A physical uplink control channel (PUCCH) is configured in the PCell and one SCell. For each cell group, the terminal transmits uplink control information (UCI) of each CC to the radio base station using the PCell or the SCell (PUCCH-SCell) in which the PUCCH is configured.

In the present embodiment, the radio base station 100 forms the PCell. The radio base station 110 forms the SCell. The SCell formed by the radio base station 110 is within a coverage area of the PCell formed by the radio base station 100. Note that the PCell may be formed by the radio base station 110. In addition, the SCell may be formed by the radio base station 100.

The terminal 200 configures the PCell and the SCell simultaneously.

The radio base station 110 includes a multi-element antenna and can form beam forming using a plurality of beams. The terminal 200 can transmit and receive a radio signal between the radio base station 110 and the terminal 200 by establishing a beam pair between the radio base station 110 and the terminal 200.

Figure 2:
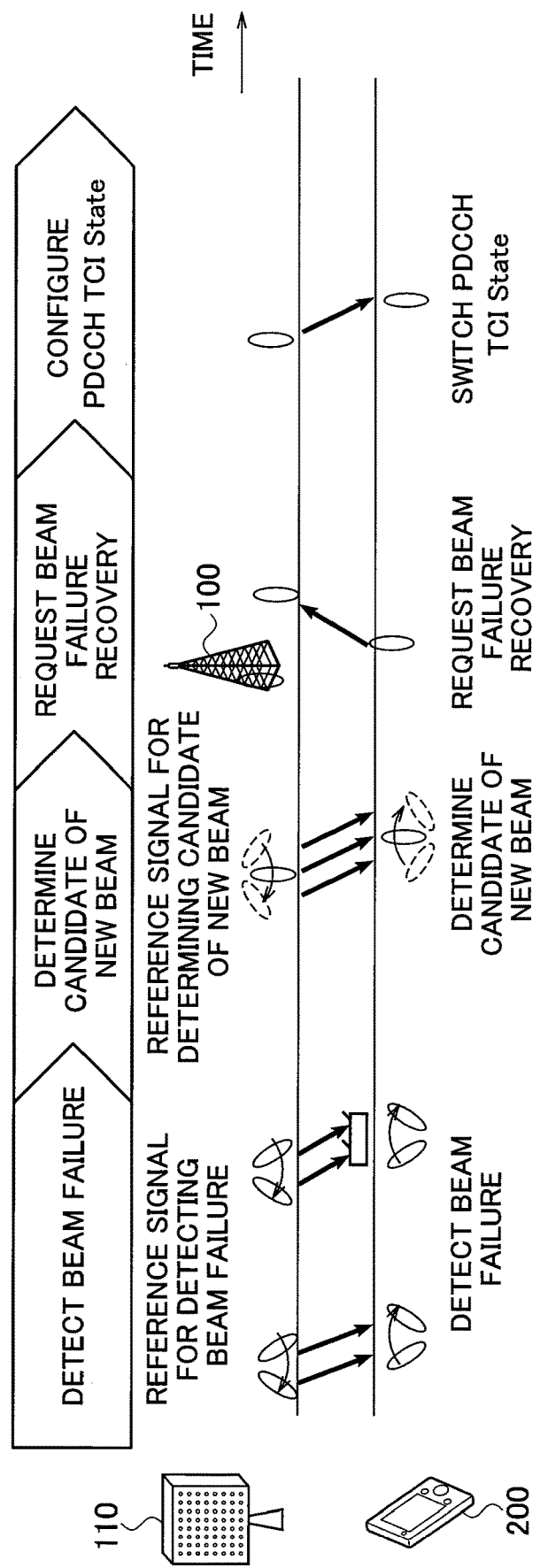
FIG. 2 is a diagram for explaining a BFR procedure in an SCell.

FIG. 2 is a diagram for explaining a beam failure recovery (hereinafter, referred to as BFR) procedure in the SCell. As illustrated in FIG. 2, in the BFR procedure, when detecting a beam failure in the SCell, the terminal 200 performs a BFR request to be described later.

Figure 3:
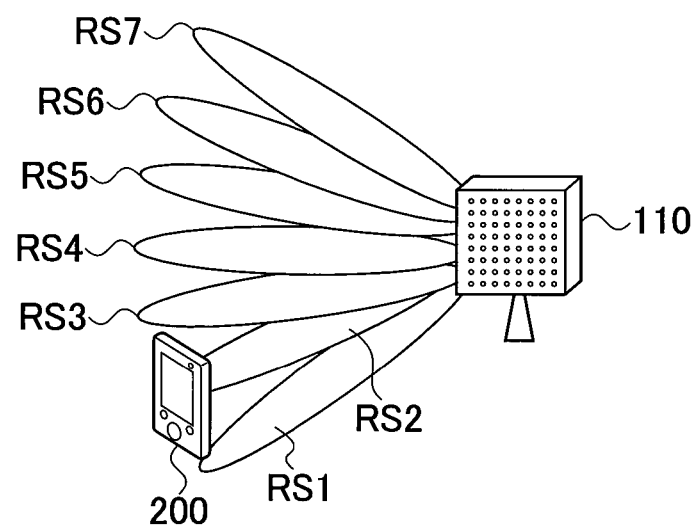
FIG. 3 is a diagram illustrating a transmission of a reference signal using beam forming.

FIG. 3 is a diagram for explaining a transmission of a reference signal using the beam forming by the radio base station 110. As illustrated in FIG. 3, the radio base station 110 transmits reference signals RS1 to RS7 for detecting a beam failure for each beam within the SCell. The reference signal RS2 for detecting a beam failure is a reference signal transmitted by terminal 200 using a beam in which a beam pair is currently established.

The reference signals RS1 to RS7 for detecting a beam failure are, for example, a channel quality information reference signal (CSI-RS) or a synchronization signal block (SSB).

The terminal 200 receives the reference signals RS1 to RS7 for detecting a beam failure, and measures reception qualities (for example, layer 1-reference signal reception power (L1-RSRP)) of the reference signals RS1 to RS7 for detecting a beam failure. The terminal 200 detects a beam failure based on a measurement result.

Specifically, when at least the reception quality of the reference signal RS2 for detecting a beam failure is equal to or lower than a threshold over a predetermined period, the terminal 200 detects the occurrence of the beam failure. Note that when the reception qualities of all the reference signals RS1 to RS7 for detecting a beam failure are equal to or lower than a threshold over a predetermined period, the terminal 200 may detect the occurrence of the beam failure.

Returning to FIG. 2, the terminal 200 receives a reference signal for determining a candidate of a new beam transmitted from the radio base station 110 for each beam. The terminal 200 measures reception quality (for example, L1-RSRP) of the reference signal for determining a candidate of a new beam. The terminal 200 determines a candidate of a new beam based on a measurement result.

Specifically, the terminal 200 determines, as a candidate of a new beam, a beam associated with a reference signal for determining a candidate of a new beam having the highest reception quality. Note that the terminal 200 may determine, as a candidate of a new beam, a predetermined number of beams associated with a predetermined number of reference signals for determining a candidate of a new beam in decreasing order of reception quality, starting with the reference signal having the highest reception quality.

The terminal 200 may determine a candidate of a new beam using reception qualities of the reference signals RS1 to RS7 for detecting a beam failure.

When the terminal 200 sets a threshold for determining a candidate of a new beam and all of reception qualities of the reference signals for determining a candidate of a new beam are equal to or less than the threshold for determining a candidate of a new beam, it may be considered that there is no candidate of a new beam.

When the terminal 200 detects a beam failure and determines a candidate of a new beam, the terminal 200 transmits a BFR request to the radio base station 100 using the PCell.

Figure 4:
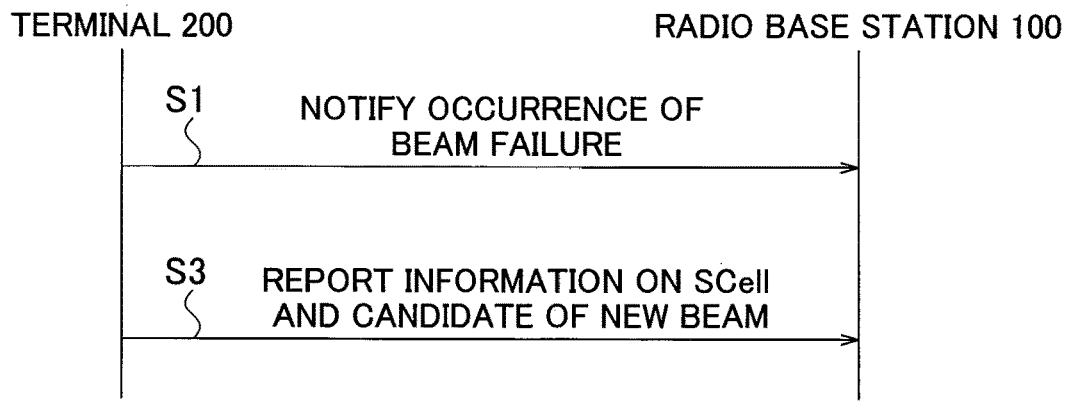
FIG. 4 is a diagram for explaining a transmission of a BFR request.

FIG. 4 is a diagram for explaining a transmission of a BFR request. As illustrated in FIG. 4, the terminal 200 requests a BFR in two steps. In step 1, the terminal 200 notifies an occurrence of a beam failure using a dedicated SR-like PUCCH (S1). The dedicated SR-like PUCCH is a message having the same function as the conventional scheduling request. In step 2, the terminal 200 reports information on an SCell in which the beam failure has occurred and a candidate of a new beam using a MAC control element (MAC CE) (S3). Note that the terminal 200 may report that a candidate of a new beam is detected, instead of reporting a candidate of a new beam.

Note that the terminal 200 may include, in one message, the occurrence of the beam failure, the information on the SCell in which the beam failure has occurred, and the candidate of the new beam, and notify the radio base station 100 of those included in the one message. In addition, in step 1, the terminal 200 may notify the occurrence of the beam failure using a message other than the dedicated SR-like PUCCH. Similarly, in step 2, the terminal 200 may report the information on the SCell in which the beam failure has occurred or the candidate of the new beam using a message other than the MAC CE. For example, the terminal 200 may notify the radio base station 100 of the candidate of the new beam through a PUCCH-SR transmission.

When the terminal 200 can use a physical random access channel (PRACH) in the SCell, the terminal 200 may notify the BFR request in the SCell using the PRACH in a manner similar to the BFR request in the PCell or the PSCell.

When the radio base station 100 receives the BFR request from the terminal 200, the radio base station 100 switches the beam used for the beam pair having established between the terminal 200 and the radio base station 110 to a new beam included in the candidate of the new beam reported using the MAC CE, in the SCell in which the beam failure has occurred. Thereby, the radio base station 100 can establish a new beam pair between the terminal 200 and the radio base station 110 using the new beam to be switched.

The radio base station 100 changes a transmission configuration indicator state (TCI state) within a layer 1 (L1) signal such as a radio resource control (RRC) message, a MAC CE, or a physical downlink control channel (PDCCH), and notifies the terminal 200 of the switching to the new beam using the RRC message, the MAC CE, or an L1 signal. In this embodiment, the TCI state is configured in the RRC message.

The terminal 200 reads the TCI state configuration in the RRC message to re-establish a beam (or beam pair) for communication between the radio base station 110 and the terminal 200, and transmission and reception of radio signals are preformed between the radio base station 110 and the terminal 200.

In the radio communication system 10, a plurality of frequency ranges (FR) is set. Specifically, FR1 and FR2 are set. In the present embodiment, the FR1 and FR2 are as follows.

FR1 (Frequency Range 1): 450 to 6,000 MHz
FR2 (Frequency Range 2): 24,250 to 52,600 MHz In the radio communication system 10, each cell belongs to the FR1 or FR2.

(2) Functional Block Configuration of Radio Communication System

Next, the functional block configuration of the radio communication system 10 will be described. Specifically, the functional block configuration of the terminal 200 will be described. Hereinafter, only portions related to the features in the present embodiment will be described. Therefore, the terminal 200 includes other functional blocks that are not directly related to the features in the present embodiment.

Figure 5:
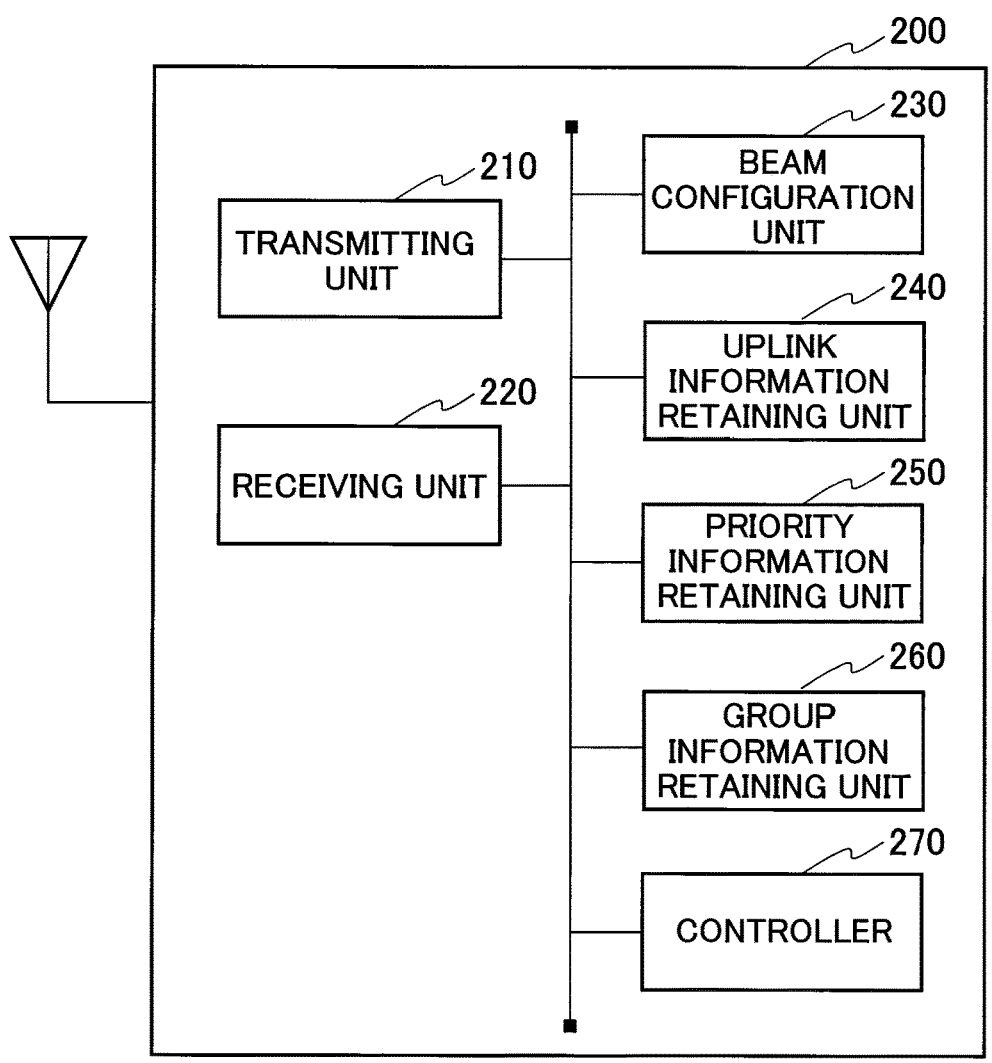
FIG. 5 is a functional block configuration diagram of a terminal 200.

FIG. 5 is a functional block configuration diagram of the terminal 200. As illustrated in FIG. 5, the terminal 200 includes a transmitting unit 210, a receiving unit 220, a beam configuration unit 230, an uplink information retaining unit 240, a priority information retaining unit 250, a group information retaining unit 260, and a controller 270.

The transmitting unit 210 transmits an uplink signal using an uplink configured in each of the PCell and the SCell. For example, the transmitting unit 210 transmits a BFR request via an uplink configured in the SCell, another uplink other than the uplink configured in the SCell, or an uplink in which an uplink channel having a short transmission interval is configured. The transmitting unit 210 transmits a BFR request in a plurality of SCells using the same message.

The receiving unit 220 receives a downlink signal using a downlink configured in each of the PCell and the SCell. For example, the receiving unit 220 receives the reference signals RS1 to RS7 for detecting a beam failure and the reference signal for determining a candidate of a new beam in the SCell. The receiving unit 220 receives the RRC message including the TCI state having the configuration change to the new beam to be switched.

The beam configuration unit 230 establishes or re-establishes a beam pair between the radio base station 110 and the terminal 200 with reference to the TCI state included in the RRC message received by the receiving unit 220.

The uplink information retaining unit 240 retains uplink information used for the transmitting unit 210 to transmit the BFR request.

The priority information retaining unit 250 retains a priority of the SCell existing in the radio communication system 10, a priority of the MAC CE to be transmitted and received in the radio communication system 10, a priority of the BFR procedure to be performed in the radio communication system 10, and a priority of a plurality of groups within a control unit that is a target of the BFR procedure.

The group information retaining unit 260 retains group information within each control unit that is a target of the BFR procedure.

The controller 270 performs a detection of the beam failure, a BFR request, a BFR complete determination, and a BFR failure determination, which will be described later. When a predetermined condition is satisfied, the controller 270 performs the BFR procedure, specifically, at least one of the detection of the beam failure and the transmission of the BFR request. The controller 270 performs only the detection of the beam failure when a predetermined condition is satisfied. When a predetermined condition is not satisfied, the controller 270 stops at least one of the detection of the beam failure and the transmission of the BFR request. The controller 270 extends a time from the detection of the beam failure to the performance of the beam failure recovery request when a predetermined condition is not satisfied.

The controller 270 determines the uplink used for the transmitting unit 210 to transmit the BFR request.

The controller 270 determines that the BFR procedure is completed when the transmitting unit 210 transmits the BFR request. The controller 270 determines that the BFR procedure is completed when the receiving unit 220 receives the configuration change to the new beam to be switched and the new beam to be switched is included in the candidate of the new beam.

The controller 270 notifies a predetermined value as the quality information of the SCell until the BFR procedure is completed. The controller 270 determines that the BFR procedure is completed when the receiving unit 220 does not receive a response to the BFR request before a predetermined period has elapsed after the transmitting unit 210 transmits the BFR request. When the controller 270 determines that the BFR procedure is completed, the controller 270 stops the transmission of the BFR request.

The controller 270 performs the BFR procedure in a predetermined cell in a predetermined group. When performing of the BFR procedure is permitted or configured for a group to which the SCell in which the terminal 200 resides belongs, the controller 270 performs the BFR procedure in the SCell. When the BFR procedure is permitted for a first group (for example, one group in a cell unit) to which the SCell in which the terminal 200 resides belongs, the controller 270 performs the detection of the beam failure, and when the BFR procedure is permitted for a second group (for example, one group in a cell group unit) to which the SCell belongs, the controller 270 performs the BFR request.

(3) Operation of Radio Communication System

Next, an operation of a radio communication system 10 in the BFR procedure will be described. Specifically, (1) an operation of the terminal 200 when detecting the beam failure, (2) an operation of the terminal 200 when performing the BFR request, (3) an operation of the terminal 200 when determining the BFR completion, (4) an operation of the terminal 200 when the BFR procedure fails, and (5) an operation of the terminal 200 when simultaneously performing the detection of the beam failure in a plurality of SCells will be described.

(3.1) Operation of Terminal 200 when Beam Failure is Detected

First, the operation of the terminal 200 when detecting the beam failure will be described.

As described above, at least when the reception quality of the reference signal RS2 for detecting a beam failure is equal to or lower than a threshold over a predetermined period, the terminal 200 detects the occurrence of the beam failure. The threshold can be set on a cell basis, but is not limited thereto, and may be set in a terminal unit, a cell group unit (which may be a cell group for DC, a cell group for a PUCCH group, and a cell group in which cells (alternatively, CCs) are grouped in general), a MAC entity unit, and an FR unit.

(3.1.1) Operation Example 1

In an operation example 1, the terminal 200 determines whether to perform the BFR procedure based on a state of the terminal 200 or the MAC entity.

Figure 6:
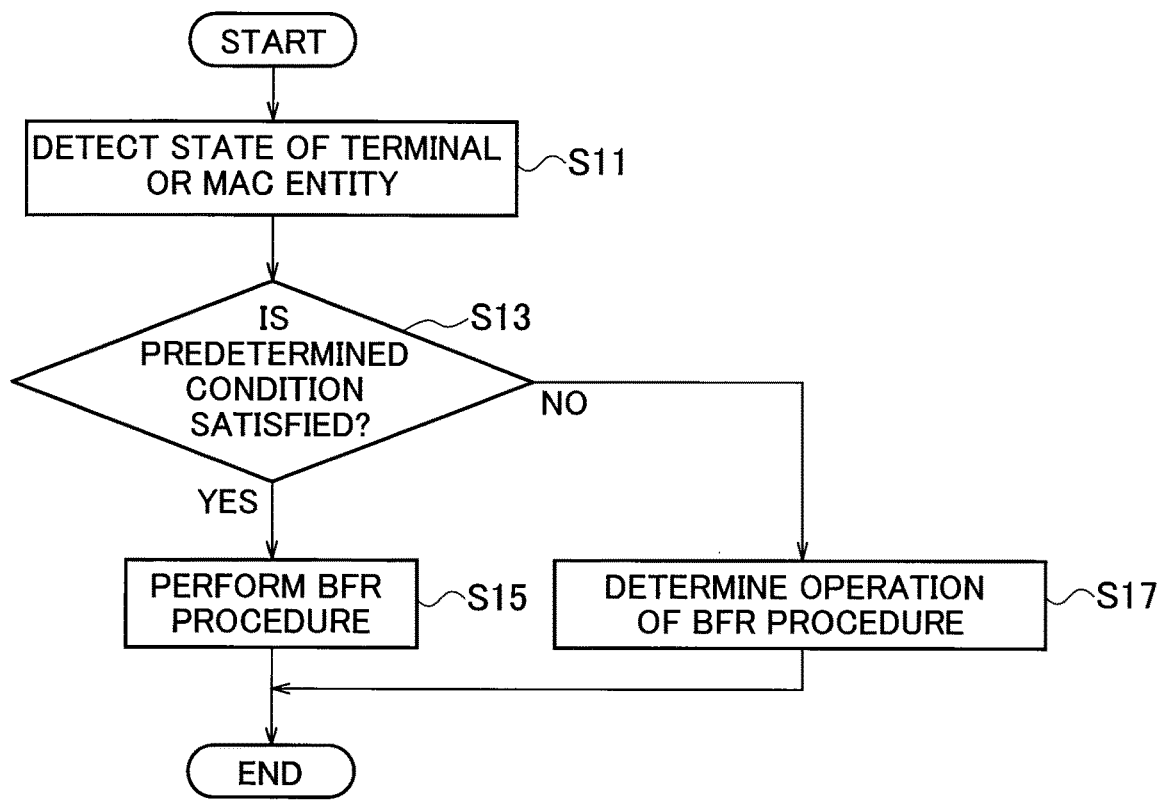
FIG. 6 is a diagram illustrating an operation flow (operation example 1) of the terminal 200 when a beam failure is detected.

FIG. 6 is a diagram illustrating an operation flow of the terminal 200 according to the operation example 1 when the beam failure is detected. As illustrated in FIG. 6, the terminal 200 detects a state of the terminal 200 or the MAC entity (S11). Next, the terminal 200 determines whether the detected state of the terminal 200 or the MAC entity satisfies a predetermined condition (S13).

Examples of the predetermined condition include a case where the terminal 200 is in an active time in a discontinuous reception state (DRX state), a case where the terminal 200 is not in a state (PDCCH skipping state) where at least a part of PDCCH decoding is not performed, and the like.

When the predetermined condition is not satisfied, specifically, when the terminal 200 is in an inactive time in the DRX state, or when the terminal 200 is in the PDCCH skipping state, a part of transmission and reception of the radio signal is not performed. Due to this, it is assumed that the amount of data transmitted and received is not large. For this reason, it is not necessary to perform the BFR procedure in the SCell at an early stage.

When the predetermined condition is satisfied, the terminal 200 performs the BFR procedure (S15). Specifically, the controller 270 performs at least one of the detection of the beam failure and the transmission of the BFR request. The controller 270 may perform only the detection of the beam failure when the predetermined condition is satisfied.

On the other hand, when the predetermined condition is not satisfied, the operation for the BFR procedure is determined (S17). For example, the terminal 200 stops the BFR procedure. Specifically, the terminal 200 stops the detection of the beam failure in the SCell. Note that the terminal 200 may also stop the BFR request when detecting the beam failure in the SCell, instead of stopping the detection of the beam failure in the SCell.

In addition, instead of stopping the BFR procedure, the terminal 200 may extend a time from the detection of the beam failure in the SCell to the performance of the BFR request longer than a normal set time (for example, several ms). In this case, the terminal 200 may be instructed by the radio base station 100 or the radio base station 110 as to whether to make the time longer than the normal set time.

The instruction can be set on a cell basis, but is not limited thereto, and may be set in a terminal unit, a cell group unit (which may be a cell group for DC, a cell group for a PUCCH group, and a cell group in which cells (alternatively, CCs) are grouped in general), a MAC entity unit, a bandwidth part (BWP) unit (which may be generalized as a resource unit in a frequency domain), a channel unit, and a state unit.

(3.1.2) Operation Example 2

In an operation example 2, the terminal 200 determines whether to perform the BFR procedure based on the state of the SCell.

Figure 7:
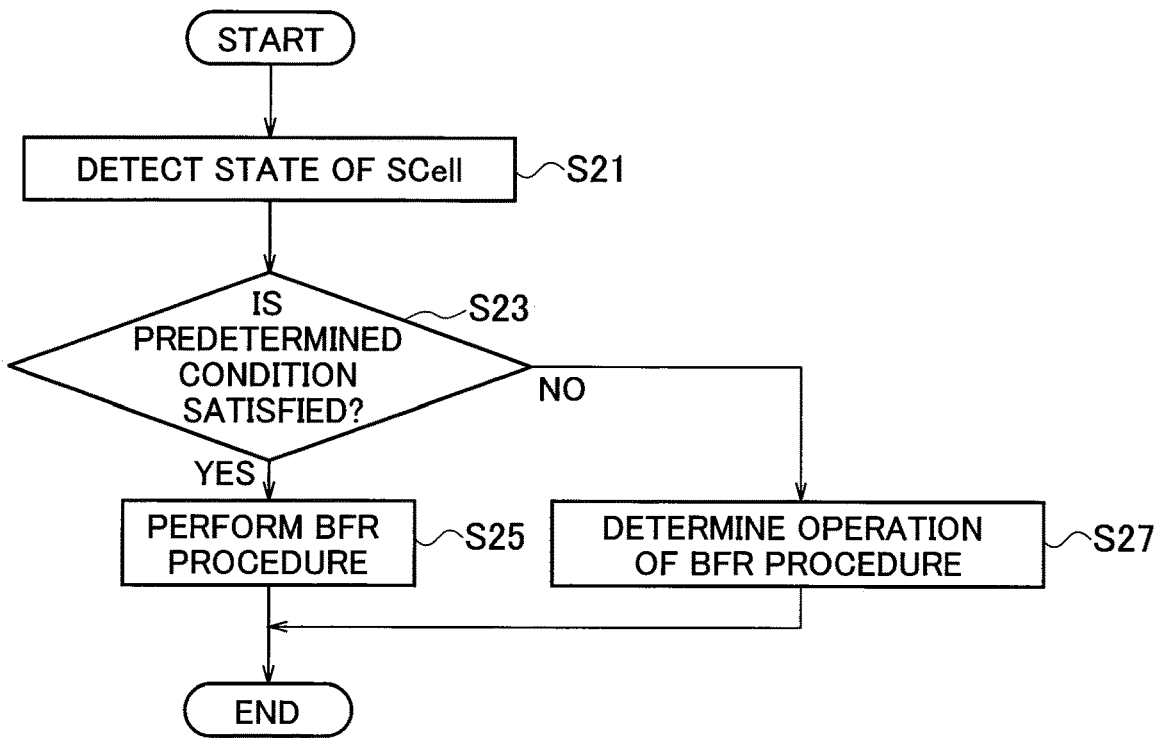
FIG. 7 is a diagram illustrating an operation flow (operation example 2) of the terminal 200 when a beam failure is detected.

FIG. 7 is a diagram illustrating an operation flow of the terminal 200 according to the operation example 2 when the beam failure is detected. As illustrated in FIG. 7, the terminal 200 detects the state of the SCell (S21). Next, the terminal 200 determines whether the detected state of the SCell satisfies a predetermined condition (S23).

Examples of the predetermined condition include a case where the SCell is in an activated state (SCell activated state), a case where the SCell is in a state where PDCCH monitoring, reception processing, and decoding processing are performed, and the like.

When the predetermined condition is not satisfied, specifically, when the SCell is in a deactivated state (SCell deactivated state), when the SCell is in the state (SCell dormant state) where at least the PDCCH monitoring, the reception processing, and the decoding processing are not performed (it is permissible not to implement, or a requirement to be satisfied at the time of implementation is relieved), it is assumed that the amount of data to be transmitted and received is not much because a part of the transmission and reception of the radio signal is not performed. For this reason, it is not necessary to perform the BFR procedure in the SCell at an early stage. This makes it possible to obtain a battery saving effect.

Note that the SCell dormant state may be a newly defined above-described state, or may be a state transitioned (activated) to a BWP where some channels such as PDCCH are not configured.

When the predetermined condition is satisfied, the terminal 200 performs the BFR procedure similar to S15 of FIG. 6. On the other hand, when the predetermined condition is not satisfied, the terminal 200 determines the operation for the BFR procedure in a manner similar to S17 of FIG. 6 (S27).

(3.1.3) Other

When the terminal 200 detects the beam failure in the SCell, the terminal 200 may stop uplink transmission in the SCell. In this case, the terminal 200 may change the stop of the uplink transmission based on a predetermined frame configuration or a duplex mode (for example, time division duplex (TDD)).

When the terminal 200 stops the uplink transmission, the terminal 200 may consider that a time alignment (TA) timer associated with the uplink transmission has expired. The terminal 200 may perform a MAC reset when stopping the uplink transmission.

When the beam failure is detected in the SCell, the terminal 200 may change the BWP configured in the SCell to a BWP that cannot perform the uplink transmission in order to stop the uplink transmission in the SCell.

(3.2) Operation of Terminal 200 when BFR Request is Performed

Next, the operation of the terminal 200 when performing the BFR request will be described.

As described above, the terminal 200 uses the dedicated SR-like PUCCH in the BFR request to notify the occurrence of the beam failure, thereby performing a scheduling request and then reporting the information on the SCell in which the beam failure occurs and the candidate of the new beam using the MAC CE.

However, the present invention is not limited thereto, and the terminal 200 may use the MAC CE to report the information on the SCell in which the beam failure occurs and the candidate of the new beam, and then use the transmission of the MAC CE as a trigger to perform a scheduling request to the radio base station 100 using PRACH or PUCCH-SR at a MAC layer.

Also, the terminal 200 may use a transmission of a normal buffer status report (BSR) as a trigger to perform the scheduling request to the radio base station 100.

Next, an uplink determination method used for the transmission of the MAC CE in the BFR request will be described.

Figure 8:
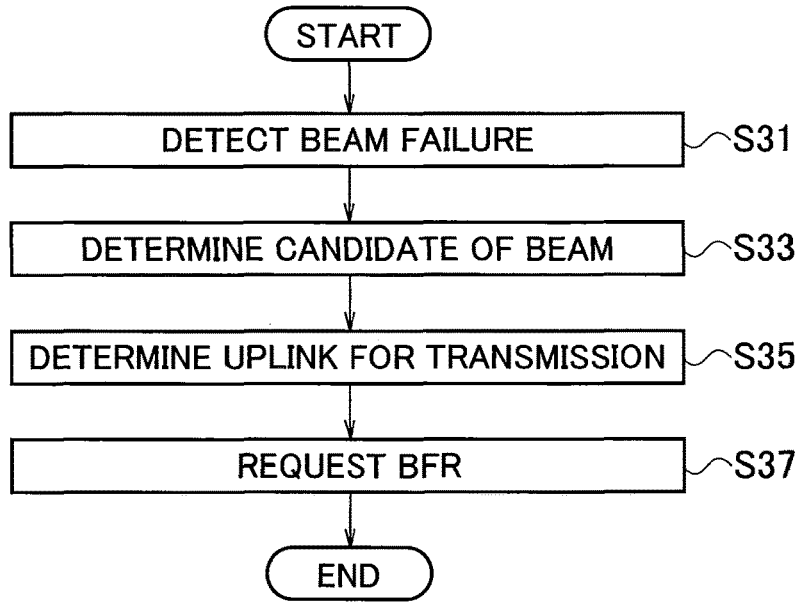
FIG. 8 is a diagram illustrating an operation flow of the terminal 200 when a BFR request is performed.

FIG. 8 is a diagram illustrating an operation flow of the terminal 200 when the BFR request is performed. As illustrated in FIG. 8, the terminal 200 detects the beam failure in the SCell (S31). When detecting the beam failure, the terminal 200 determines a candidate of a new beam (S33). Subsequently, the terminal 200 determines an uplink used to transmit the MAC CE in order to perform the BFR request (S35).

Specifically, the terminal 200 selects the following uplinks as an uplink used to transmit the MAC CE in order to reliably transmit the MAC CE.

An uplink other than the uplink (for example, the uplink configured by a UL grant in the SCell) configured in the SCell in which the beam failure is detected.

An uplink designated by PCell, the radio base station 100, or the radio base station 110.

The terminal 200 may select the following uplinks as an uplink to be used to transmit the MAC CE in order to transmit the MAC CE at an early stage.

An uplink (for example, an uplink with a short PUSCH duration in a logical channel (LCH) restriction) in which an uplink channel with a short transmission interval is configured in a cell or subcarrier interval.

An uplink from which terminal 200 first obtains a transmission opportunity after determining a candidate of a new beam.

When the terminal 200 determines the uplink to be used to transmit the MAC CE, the terminal 200 performs the BFR request by transmitting the MAC CE using the determined uplink (S37).

Note that the terminal 200 can preferentially transmit the MAC CE to be used to perform the BFR request than a predetermined MAC CE, regarding a priority between the MAC CE to be used to perform the BFR request and other MAC CEs. For example, the MAC CE to be used to perform the BFR request can be preferentially transmitted than a BSR or a power headroom (PHR).

When the terminal 200 can store other data in the MAC CE to be used to perform the BFR request, the terminal 200 may include the BSR or the PHR in the MAC CE, for example.

(3.3) Operation of Terminal 200 when BFR is Determined to be Completed

Next, a method for determining whether the BFR procedure is completed after the BFR request is performed by the terminal 200 in the SCell will be described.

Figure 9:
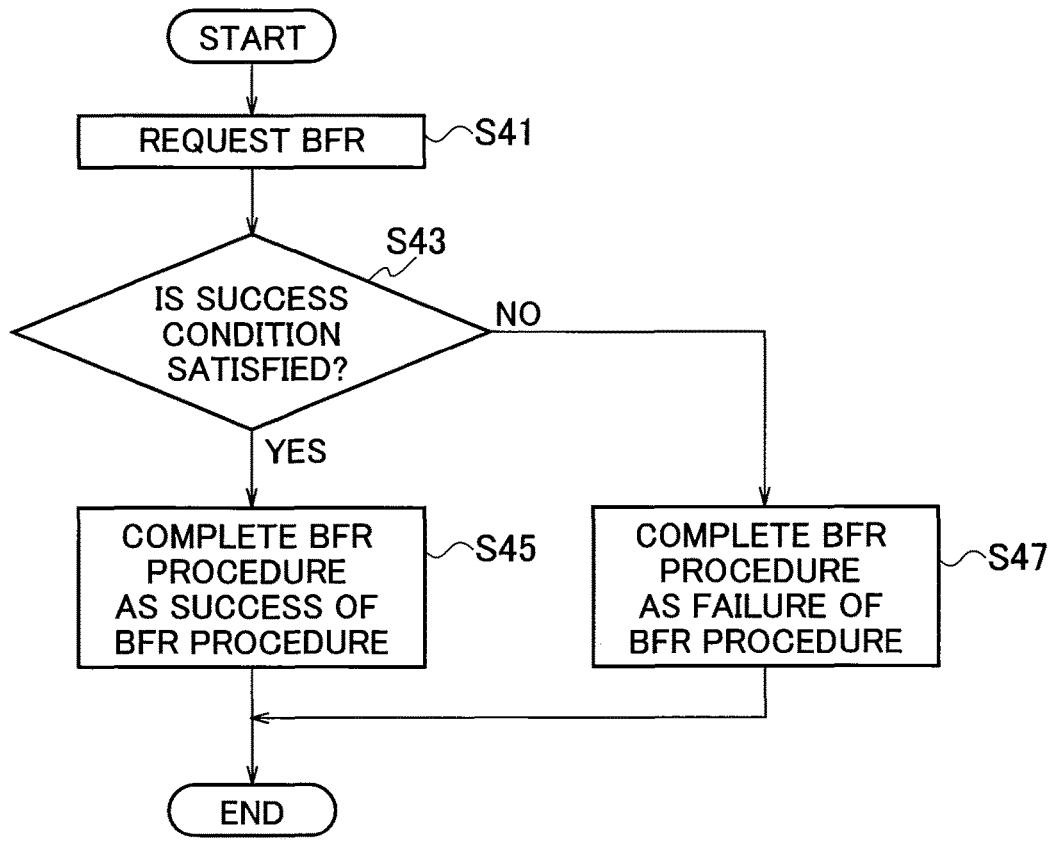
FIG. 9 is a diagram illustrating an operation flow of the terminal 200 when a BFR completion is determined.

FIG. 9 is a diagram illustrating an operation flow of the terminal 200 when the BFR request is performed. As illustrated in FIG. 9, the terminal 200 performs the BFR request in the SCell (S41). When the terminal 200 performs the BFR request, the terminal 200 determines whether a success condition is satisfied (S43).

Specifically, the terminal 200 determines that the success condition is satisfied when the MAC CE is transmitted using the uplink in the BFR request. Note that the terminal 200 may determine that the success condition is satisfied when a predetermined period elapses after transmitting the MAC CE.

In the BFR request, after transmitting the MAC CE using the uplink, the terminal 200 can determine that the success condition is satisfied when a new transmission is triggered in Hybrid-ARQ (HARQ) processing or process activated by the transmission of the MAC CE. Note that when receiving an acknowledgment (ACK) for the transmission of the MAC CE, the terminal 200 may determine that the success condition is satisfied.

The terminal 200 may determine that a success report is satisfied when the TCI state within the RRC message received from the radio base station 100 is changed. In this case, the terminal 200 may determine that the success condition is satisfied when the RRC message is received via a physical downlink control channel (PDCCH) with a predetermined control resource set (CORSET). In this case, the PDCCH may be configured in the SpCell or SCell.

The terminal 200 may determine that the success condition is satisfied when it is detected that a physical downlink shared channel (PDSCH) including the MAC CE to be used to transmit a candidate of a new beam is scheduled, the PDSCH is detected, the PDSCH is received, a decoding result (CRC) is OK, the MAC CE is included, and the like, with a predetermined CORSET.

When a beam to be switched which is configured in the TCI state within the RRC message received from the radio base station 100 is included in the candidate of the new beam transmitted to the radio base station 100 using the MAC CE, the terminal 200 may determine that the success condition is satisfied.

When determining that the success condition is satisfied, the terminal 200 determines that the BFR procedure succeeds, and the BFR procedure is completed (S45).

On the other hand, when determining that the success condition is not satisfied, the terminal 200 determines that the BFR procedure fails, and the BFR procedure is completed (S47). In this case, the terminal 200 may report the result to the radio base station 100. For example, SCell failure information, SCG failure information, or a measurement report may be transmitted. The terminal 200 may notify a value outside a set range as a channel quality indicator (CQI). The terminal 200 may notify the radio base station 100 that the monitoring of a candidate of a new beam and the report of a candidate of a new beam are stopped.

Note that the terminal 200 may determine whether a failure condition is satisfied in S43. For example, the terminal 200 determines that the failure condition is satisfied when notifying the radio base station 100 that there is no candidate of a new beam using the MAC CE in the BFR request. In this case, since the terminal 200 transmits the MAC CE, it may determine that the success condition is satisfied. Note that the terminal 200 may notify the radio base station 100 of the MAC CE that does not include a candidate of a new beam.

In this case, the radio base station 100 may deactivate the SCell. Also, the radio base station 100 may change the SCell to the SCell dormant state.

If the terminal 200 transmits the MAC CE and then does not receive a response from the radio base station 100 before a predetermined period has elapsed, the terminal 200 may determine that the failure condition is satisfied. In this case, the MAC CE may include or may not include a candidate of a new beam.

When determining that the failure condition is satisfied, the terminal 200 determines that the BFR procedure fails, and the BFR procedure is completed. On the other hand, when determining that the failure condition is not satisfied, the terminal 200 determines that the BFR procedure succeeds, and the BFR procedure is completed.

The terminal 200 notifies a predetermined value as a CSI report of the SCell until the BFR procedure is completed. For example, the terminal 200 notifies a value outside a set range as the predetermined value. In addition, the terminal 200 notifies a value less than or equal to a predetermined value as a CQI until the BFR procedure is completed.

(3.4) Operation of Terminal 200 when BFR Procedure Fails

Next, the operation of the terminal 200 when the BFR procedure fails will be described.

Figure 10:
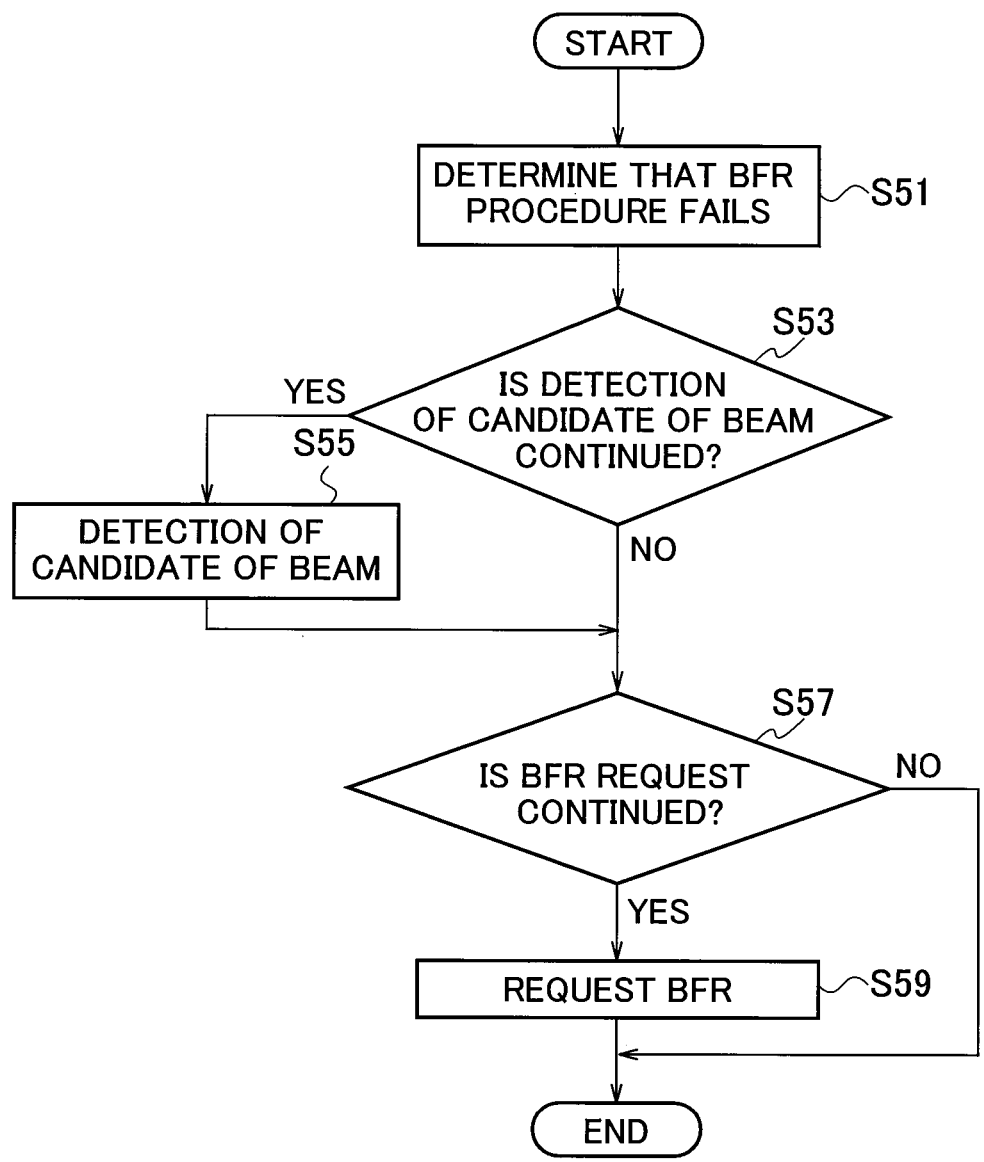
FIG. 10 is a diagram illustrating an operation flow of the terminal 200 when a BFR procedure fails.

FIG. 10 is a diagram illustrating the operation flow of the terminal 200 when the BFR procedure fails. As illustrated in FIG. 10, the terminal 200 determines that the BFR procedure fails (S51). Subsequently, the terminal 200 determines whether to continue a detection of a candidate of a new beam (S53). When the detection of the candidate of the new beam is continued, the terminal 200 detects the candidate of the new beam (S55). Subsequently, the terminal 200 determines whether to continue the BFR request (S57).

On the other hand, when the detection of the candidate of the new beam is not continued, the terminal 200 determines whether to continue the BFR request (S57). When continuing the BFR request, the terminal 200 continues the BFR request (S59). On the other hand, when the BFR request is not continued, the terminal 200 ends the BFR procedure.

When the terminal 200 determines that the BFR procedure fails by notifying the radio base station 100 of the MAC CE that does not include a candidate of a new beam, the terminal 200 may determine to continue a detection of a candidate of a new beam in S53. In this case, the terminal 200 monitors a reference signal for detecting a candidate of a new beam again. Note that the terminal 200 may stop the monitoring when a predetermined period has elapsed. Thereby, the battery saving of the terminal 200 can be performed.

On the other hand, when the terminal 200 determines that the BFR procedure fails by notifying the radio base station 100 of the MAC CE that does not include a candidate of a new beam, the terminal 200 may determine not to continue a detection of a candidate of a new beam in S53. In this case, the battery saving of the terminal 200 can be performed.

When determining that the BFR procedure fails by not receiving a response from the radio base station 100 before a predetermined period has elapsed, the terminal 200 may determine that a detection of a candidate of a new beam is continued in S53, and determine that the BFR request is continued in S57. In this case, the terminal 200 monitors a reference signal for detecting a candidate of a new beam again and performs the BFR request. Note that the terminal 200 may stop the monitoring when a predetermined period has elapsed. Thereby, the battery saving of the terminal 200 can be performed.

On the other hand, the terminal 200 may determine that a detection of a candidate of a new beam is not continued in S53, and determine that the BFR request is continued in S57. In this case, since the terminal 200 repeatedly performs the BFR request, the terminal 200 appropriately transmits a first detected candidate of a new beam to the radio base station 100.

In addition, the terminal 200 may determine that a detection of a candidate of a new beam is not continued in S53, and determine that the BFR request is not continued in S57. In this case, the battery saving of the terminal 200 can be performed.

As another example, the terminal 200 may resume a detection of a candidate of a new beam by using a start of another BFR procedure for another CC as a trigger. In this case, the radio base station 100 can be notified by including a detected candidate of a new beam in a report in another BFR procedure.

(3.5) Operation of Terminal 200 when Detection of Beam Failure is Performed Simultaneously in SCells Next, the operation of terminal 200 when the detection of the beam failure is simultaneously performed in a plurality of SCells will be described.

In the radio communication system 10, when there is a plurality of SCells, the plurality of SCells is grouped for each control unit that is a target in which the BFR procedure is to be performed. That is, each of the plurality of SCells is associated with a control unit that is a target in which the BFR procedure is to be performed. For example, examples of the control unit include a cell unit, a terminal unit, a cell group unit (which may be a cell group for DC, a cell group for a PUCCH group, and a cell group in which cells (alternatively, CCs) are grouped in general), a MAC entity unit, an FR unit, and the like.

Within each control unit, the BFR procedure can be performed only on a predetermined number of cells at the same time. Between control units, cells in the control units can execute the BFR procedure in parallel.

In the case of an operation in a cell unit, the BFR procedure may be executed in all cells (or SCells) for which the execution of the BFR procedure is configured (or permitted).

Note that in the case of an operation in a cell group unit, the BFR procedure may be performed only for a predetermined number (for example, one) of SCells in each cell group in which the execution of the BFR procedure is permitted. For example, in the case of the operation in the cell group unit, the BFR procedure can be performed for only one SCell within one cell group. The predetermined cell may be designated by an RRC message, a MAC signal, or an L1 signal from NW, or a predetermined condition (for example, a cell having a predetermined index (ServcellIndex, ScellIndex, BWP-id, or the like), a maximum index, or a minimum index) may be selected.

Further, in the case of the operation in the cell group unit, mapping between each SCell and a cell group may be specified from the radio base station 100 using, for example, Quasi Co Location (QCL) or TCI state.

When no mapping is designated from the radio base station 100, each SCell may be mapped to a predetermined cell group. In this case, for example, each SCell is mapped to the same cell group as the SpCell, a cell group having a predetermined cell group index (maximum, minimum), a first configured cell group, or the like.

Within each control unit, a priority for performing the BFR procedure may be determined. For example, in the case of the operation in the cell group unit, a high priority is assigned to the SpCell, an SCell in which the PUCCH is configured, an SCell activated earlier in time, or a group including a predetermined SCell. Also, a priority for performing the BFR procedure may be specified by the radio base station 100. Note that a low-priority BFR procedure may be stopped or suspended.

Thus, by grouping a plurality of SCells for each control unit that is a target of the BFR procedure, an increase in a transmission opportunity of the MAC CE, an increase in overhead due to an increase in RRC messages, and the like can be reduced.

Note that the control unit may be different for each process of the BFR procedure. The processing in the BFR procedure includes, for example, the detection of the beam failure, the BFR request, the completion determination of the BFR procedure, and the failure determination of the BFR procedure described above.

For example, when the detection of the beam failure is performed in a cell unit and the BFR request is performed in a cell group unit, the BFR request is performed in any of a plurality of SCells even if the detection of the beam failure is performed in the plurality of SCells.

In this case, when the BFR request is completed in any SCell, the BFR request in the same cell group may be considered to be completed. Note that when the BFR request is completed in a predetermined cell in a cell group, the BFR request in the same cell group may be considered to be completed.

(3.5.1) Operation Example 1

Figure 11:
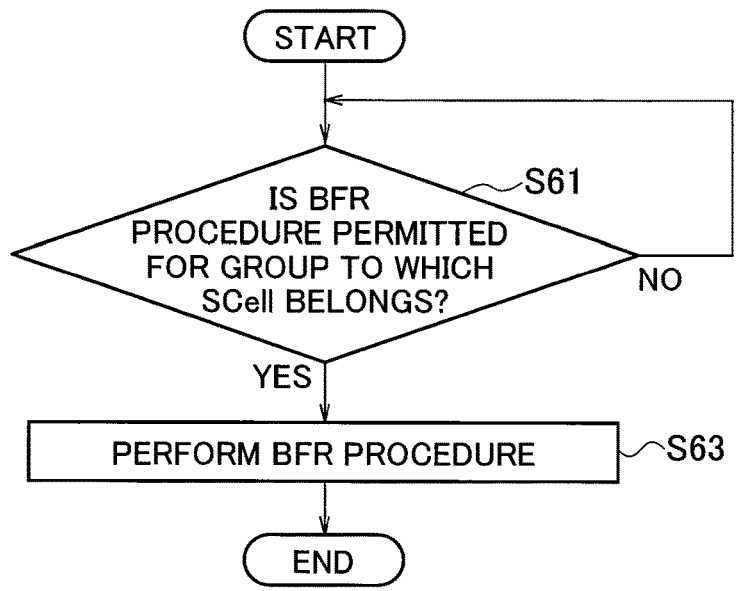
FIG. 11 is a diagram illustrating an operation flow (operation example 1) of the terminal 200 when the detection of the beam failure is performed simultaneously in a plurality of SCells.

FIG. 11 is a diagram illustrating the operation flow of the terminal 200 according to operation example 1 when the detection of the beam failure is performed simultaneously in a plurality of SCells. As illustrated in FIG. 11, the terminal 200 determines whether the BFR procedure is permitted for a group to which an SCell in which the terminal 200 resides belongs (S61).

When the BFR procedure is permitted, the terminal 200 performs the BFR procedure. On the other hand, when the BFR procedure is not permitted, the terminal 200 waits until the BFR procedure is permitted for the group to which the SCell belongs.

(3.5.2) Operation Example 2

Figure 12:
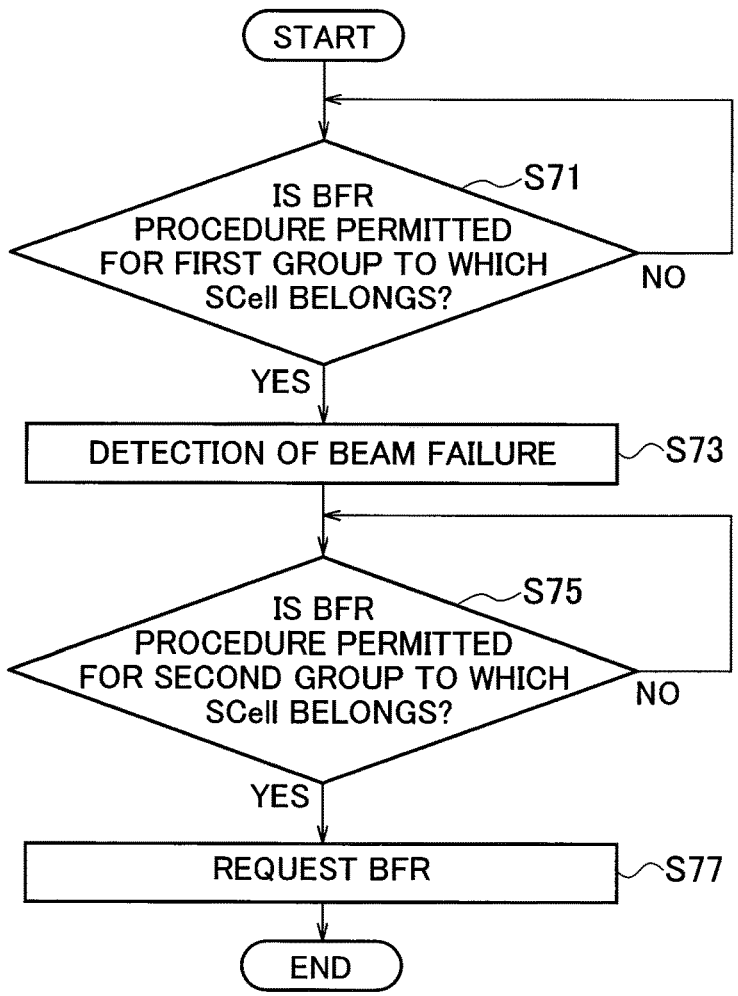
FIG. 12 is a diagram illustrating an operation flow (operation example 2) of the terminal 200 when the detection of the beam failure is performed simultaneously in a plurality of SCells.

FIG. 12 is a diagram illustrating the operation flow of the terminal 200 according to operation example 2 when the detection of the beam failure is performed simultaneously in a plurality of SCells. As illustrated in FIG. 12, the terminal 200 determines whether the BFR procedure is permitted for a first group (for example, one group in a cell unit) to which an SCell in which the terminal 200 resides belongs (S71).

When the BFR procedure is permitted, the terminal 200 performs the detection of the beam failure (S73). On the other hand, when the BFR procedure is not permitted, the terminal 200 waits until the BFR procedure is permitted for the first group.

When the terminal 200 detects the beam failure in the SCell, the terminal 200 determines whether the BFR procedure is permitted for a second group (for example, one group within a cell group unit) to which the SCell in which the terminal 200 resides belongs (S75).

When the BFR procedure is permitted, the terminal 200 performs the BFR request (S77). On the other hand, when the BFR procedure is not permitted, the terminal 200 waits until the BFR procedure is permitted for the second group.

(3.5.3) Operation Example 3

Operation example 3 describes an operation example of the terminal 200 when the terminal 200 detects the beam failures in a plurality of SCells.

Figure 13:
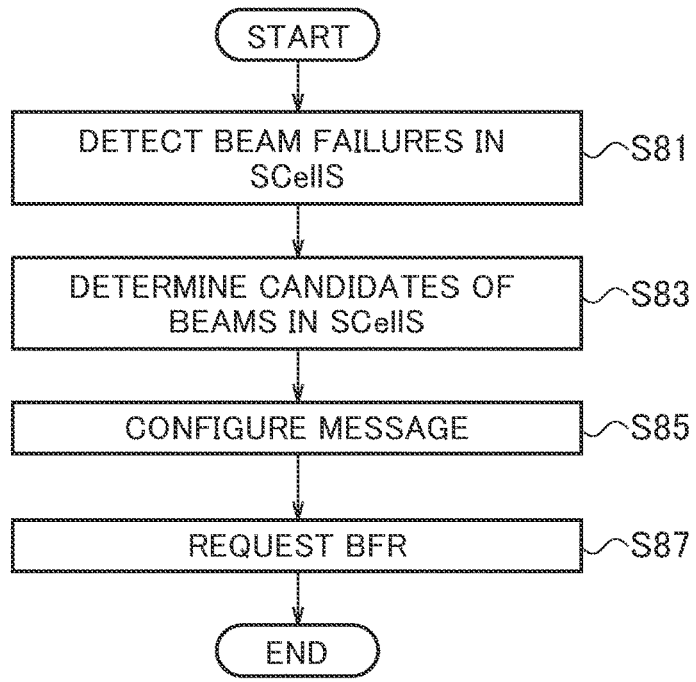
FIG. 13 is a diagram illustrating an operation flow (operation example 3) of the terminal 200 when the detection of the beam failure is performed simultaneously in a plurality of SCells.

FIG. 13 is a diagram illustrating the operation flow of the terminal 200 according to operation example 3 when the detection of the beam failure is performed simultaneously in a plurality of SCells. As illustrated in FIG. 13, the terminal 200 detects the beam failures in the plurality of SCells (S81). Subsequently, the terminal 200 determines a candidate of a new beam in each of the plurality of SCells (S83).

When determining a candidate of a new beam in each SCell, the terminal 200 configures a message to be used to report candidates of new beams in the plurality of SCells to the radio base station 100 (S85).

Specifically, the terminal 200 configures information on the candidates of the new beams in the plurality of SCells within the same MAC CE. In this case, the terminal 200 may configure information on the candidates of the new beams in the plurality of SCells within the same MAC CE according to a predetermined priority.

For example, the terminal 200 may store the candidates of the new beams detected earlier in time in the same MAC CE in order. The terminal 200 may preferentially store a candidate of a new beam in a predetermined SCell in the same MAC CE. The terminal 200 may preferentially store a candidate of a new beam in an SCell designated from the radio base station 100 in the same MAC CE.

Note that the terminal 200 may store different MAC CEs each in which information on a candidate of a new beam in each SCell is configured, in the same MAC packet data unit (PDU).

The terminal 200 performs the BFR request using the same message (S87). Specifically, the terminal 200 reports the candidates of the new beams in the plurality of SCells to the radio base station 100 using the same MAC CE or MAC PDU.

(4) Action and Effect

According to the embodiment described above, the SCell belongs to a predetermined group regarding the BFR procedure, and the terminal 200 performs the BFR procedure in a predetermined cell within the predetermined group. For example, when the execution of the BFR procedure is permitted or configured for a predetermined cell, the terminal 200 performs the BFR procedure.

With such a configuration, since the number of SCells in which the BFR procedures are simultaneously performed can be reduced, the amount of transmission of the BFR request is reduced.

Therefore, with this feature, the terminal 200 can perform the BFR procedure while suppressing the increase in the load on the network.

According to the present embodiment, a plurality of predetermined groups regarding the BFR procedure is configured.

Even with such a configuration, since the number of SCells in which the BFR procedures are simultaneously performed can be reduced, the amount of transmission of the BFR request is reduced.

According to the present embodiment, when the plurality of predetermined cells is configured, the terminal 200 transmits the BFR requests in the plurality of SCells using the same message.

Even with such a configuration, the amount of transmission of the BFR request can be reduced.

(5) Other Embodiments

Although the contents of the present invention have been described along with the embodiment, the present invention is not limited to these descriptions, and it is obvious to those skilled in the art that various modifications and improvements can be made thereto.

The block diagram (FIG. 5) used for explaining the above-described embodiment illustrates blocks of functional unit. Those functional blocks (structural components) are realized by a desired combination of at least one of hardware and software. A method for realizing each functional block is not particularly limited. That is, each functional block may be realized by one device combined physically or logically.

Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (structural component) that causes transmitting is referred to as a transmitting unit or a transmitter. For any of the above, as explained above, the realization method is not particularly limited to any one method.

Figure 14:
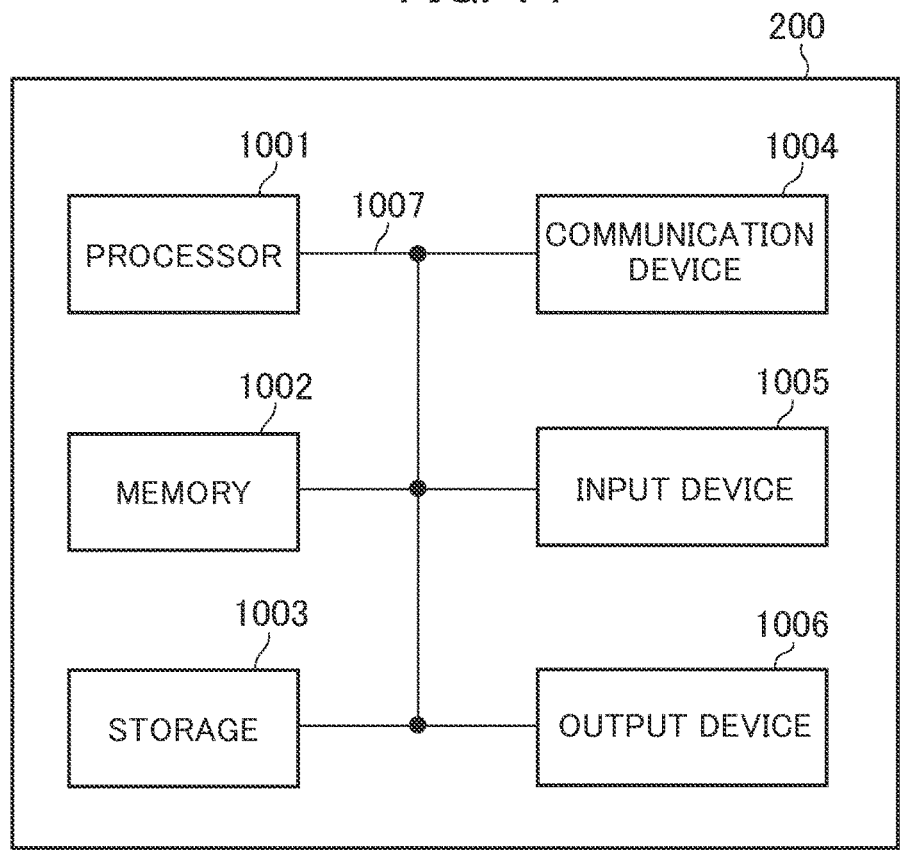
FIG. 14 is a diagram illustrating an example of a hardware configuration of the terminal 200.

Furthermore, the terminal 200 explained above may function as a computer that performs the processing of the radio communication method of the present disclosure. FIG. 14 is a diagram illustrating an example of a hardware configuration of the terminal. As illustrated in FIG. 14, the terminal can be configured as a computer device including a processor 1001, a memory 1002, a storage 1003, a communication device 1004, an input device 1005, an output device 1006, a bus 1007, and the like Furthermore, in the following explanation, the term "device" can be replaced with a circuit, device, unit, and the like. A hardware configuration of the device may be constituted by including one or plurality of the devices illustrated in the figure, or may be constituted without including some of the devices.

The functional blocks of the device are realized by any of hardware elements of the computer device or a combination of the hardware elements.

Moreover, the processor 1001 performs operation by loading a predetermined software (program) on hardware such as the processor 1001 and the memory 1002, and realizes various functions of the device by controlling communication via the communication device 1004, and controlling at least one of reading and writing of data on the memory 1002 and the storage 1003.

The processor 1001, for example, operates an operating system to control the entire computer. The processor 1001 can be configured with a central processing unit (CPU) including an interface with a peripheral device, a control device, an operation device, a register, and the like.

Moreover, the processor 1001 reads a program (program code), a software module, data, and the like from at least one of the storage 1003 and the communication device 1004 into the memory 1002, and executes various processing according to them. As the program, a program that is capable of executing on the computer at least a part of the operation explained in the above embodiments, is used. Alternatively, various processing explained above may be executed by one processor 1001 or may be executed simultaneously or sequentially by two or more processors 1001. The processor 1001 may be implemented by using one or more chips. Alternatively, the program may be transmitted from a network via a telecommunication line.

The memory 1002 is a computer readable recording medium and may be configured, for example, with at least one of Read Only Memory (ROM), Erasable Programmable ROM (EPROM), Electrically Erasable Programmable ROM (EEPROM), Random Access Memory (RAM), and the like. The memory 1002 can be referred to as register, cache, main memory (main storage device), and the like. The memory 1002 can store therein a program (program codes), software modules, and the like that can execute the method according to the embodiment of the present disclosure.

The storage 1003 is a computer readable recording medium. Examples of the storage 1003 include at least one of an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 may be referred to as an auxiliary storage device. The recording medium can be, for example, a database including at least one of the memory 1002 and the storage 1003, a server, or other appropriate media.

The communication device 1004 is hardware (transmission and reception device) capable of performing communication between computers via at least one of a wired network and a wireless network. The communication device 1004 is also referred to as, for example, a network device, a network controller, a network card, a communication module, and the like.

The communication device 1004 may include a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information therebetween. The bus 1007 may be constituted by a single bus or may be constituted by separate buses between the devices.

Further, the device may be configured to include hardware such as a microprocessor, Digital Signal Processor (DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Notification of information is not limited to that explained in the above aspect/embodiment, and may be performed by using a different method. For example, the notification of information may be performed by physical layer signaling (for example, Downlink Control Information (DCI), Uplink Control Information (UCI), higher layer signaling (for example, RRC signaling, Medium Access Control (MAC) signaling, broadcast information (Master Information Block (MIB), and System Information Block (SIB)), other signals, or a combination of these. The RRC signaling may be referred to as RRC message, for example, or may be RRC Connection Setup message, RRC Connection Reconfiguration message, or the like.

Each of the above aspects/embodiments may be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information and signals (information and the like) can be output from a higher layer (or lower layer) to a lower layer (or higher layer). It may be input and output via a plurality of network nodes.

The input and output information can be stored in a specific location (for example, a memory) or may be managed in a management table. The information to be input and output can be overwritten, updated, or added. The information may be deleted after outputting. The inputted information may be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, and it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, optical fiber cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

Note that the terms described in the present disclosure and terms necessary for understanding the present disclosure may be replaced by terms having the same or similar meanings. For example, at least one of a channel and a symbol may be a signal (signaling). Also, a signal may be a message. Further, a component carrier (CC) may be referred to as a carrier frequency, a cell, a frequency carrier, or the like.

The terms "system" and "network" used in the present disclosure can be used interchangeably.

Furthermore, the information, the parameter, and the like explained in the present disclosure may be represented by an absolute value, may be expressed as a relative value from a predetermined value, or may be represented by corresponding other information. For example, the radio resource may be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also referred to as sectors). In a configuration in which the base station accommodates a plurality of cells, the entire coverage area of the base station can be divided into a plurality of smaller areas. In each of such a smaller area, communication service can be provided by a base station subsystem (for example, a small base station for indoor use (Remote Radio Head: RRH)).

The term "cell" or "sector" refers to a part or all of the coverage area of at least one of a base station and a base station subsystem that performs communication service in this coverage.

In the present disclosure, the terms "mobile station (MS)", "user terminal", "user equipment (UE)", "terminal" and the like can be used interchangeably.

The mobile station may be called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be referred to as a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), or a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same applies). For example, each of the aspects/embodiments of the present disclosure may be applied to a configuration that allows communication between a base station and a mobile station to be replaced with communication between a plurality of mobile stations (which, may be referred to as, for example, Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms such as an uplink channel, a downlink channel, or the like may be replaced as a side channel.

Likewise, a mobile station in the present disclosure may be read as a base station. In this case, the base station may have the function of the mobile station.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using at least one of one or more wires, cables, and printed electrical connections, and as some non-limiting and non-exhaustive examples, by using electromagnetic energy having wavelengths in the radio frequency region, the microwave region, and light (both visible and invisible) region, and the like.

The reference signal may be abbreviated as RS and may be referred to as pilot according to applicable standards.

As used in the present disclosure, the phrase "based on" does not mean "based only on" unless explicitly stated otherwise. In other words, the phrase "based on" means both "based only on" and "based at least on".

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as "a", "an", and "the" in English are added, in the present disclosure, these articles may include a plurality of nouns following these articles.

In the present disclosure, the term "A and B are different" may mean "A and B are different from each other". Note that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

INDUSTRIAL APPLICABILITY

According to the terminal described above, the terminal is useful to recover the beam failure while suppressing the increase in the load on the network in the secondary cell.

EXPLANATION OF REFERENCE NUMERALS

10 Radio communication system
100 Radio base station
110 Radio base station
200 Terminal
210 Transmitting unit
220 Receiving unit
230 Beam configuration unit
240 Uplink information retaining unit
250 Priority information retaining unit
260 Group information retaining unit
270 Controller
1001 Processor
1002 Memory
1003 Storage
1004 Communication device
1005 Input device
1006 Output device
1007 Bus

The invention claimed is:

1. A terminal that simultaneously configures a primary cell and a secondary cell, comprising:
   a receiver that receives a reference signal for use in a detection of a beam failure in the secondary cell; and
   a controller that performs a beam failure recovery procedure when the beam failure is detected based on a reception quality of the reference signal, wherein
   the secondary cell belongs to one cell group among a plurality of cell groups,
   the controller performs the beam failure recovery procedure in the secondary cell when execution of the beam failure recovery procedure is configured for the secondary cell, and
   the terminal further comprises a transmitter that transmits, when beam failures are detected in a plurality of secondary cells, candidates of new beams in the plurality of the secondary cells using a same media access control (MAC) control element (CE) in the secondary cell for which execution of the beam failure recovery procedure is configured, among the plurality of secondary cells.

2. The terminal according to claim 1, wherein the plurality of cell groups are cell groups regarding the beam failure recovery procedure.

3. The terminal according to claim 1, wherein the controller configures information on the candidates of the new beams in the same MAC CE such that a candidate of a new beam in a secondary cell designated from a radio base station is preferentially stored in the same MAC CE.

4. A radio communication method comprising:
configuring a primary cell and a secondary cell simultaneously;
receiving a reference signal for use in a detection of a beam failure in the secondary cell; and
performing a beam failure recovery procedure when the beam failure is detected based on a reception quality of the reference signal, wherein
the secondary cell belongs to one cell group among a plurality of cell groups,
the beam failure recovery procedure is performed in the secondary cell when execution of the beam failure recovery procedure is configured for the secondary cell, and
the radio communication method further comprises transmitting, when beam failures are detected in a plurality of secondary cells, candidates of new beams in the plurality of the secondary cells using a same media access control (MAC) control element (CE) in the secondary cell for which execution of the beam failure recovery procedure is configured, among the plurality of secondary cells.

5. A radio communication system comprising:
a first radio base station that forms a primary cell;
a second radio base station that forms a secondary cell; and
a terminal that simultaneously configures the primary cell and the secondary cell, wherein
the terminal receives from the second radio base station, a reference signal for use in a detection of a beam failure in the secondary cell,
the terminal performs a beam failure recovery procedure when the beam failure is detected based on a reception quality of the reference signal,
the secondary cell belongs to one cell group among a plurality of cell groups,
the terminal performs the beam failure recovery procedure in the secondary cell when execution of the beam failure recovery procedure is configured for the secondary cell, and
the terminal transmits, when beam failures are detected in a plurality of secondary cells, candidates of new beams in the plurality of the secondary cells using a same media access control (MAC) control element (CE) in the secondary cell for which execution of the beam failure recovery procedure is configured, among the plurality of secondary cells.

* * * * *